US010726374B1

(12) United States Patent
Engineer et al.

(10) Patent No.: US 10,726,374 B1
(45) Date of Patent: Jul. 28, 2020

(54) RISK PREDICTION BASED ON AUTOMATED ANALYSIS OF DOCUMENTS

(71) Applicant: Icertis, Inc., Bellevue, WA (US)

(72) Inventors: Sunu Engineer, Pune (IN); Amitabh Jain, Pune (IN); Monish Mangalkumar Darda, Pune (IN)

(73) Assignee: Icertis, Inc., Bellevue, WA (US)

( * ) Notice: Subject to any disclaimer, the term of this patent is extended or adjusted under 35 U.S.C. 154(b) by 0 days.

(21) Appl. No.: 16/279,974

(22) Filed: Feb. 19, 2019

(51) Int. Cl.
*G06N 20/00* (2019.01)
*G06F 40/30* (2020.01)
*G06Q 10/06* (2012.01)
*G06Q 50/18* (2012.01)

(52) U.S. Cl.
CPC ......... *G06Q 10/0635* (2013.01); *G06F 40/30* (2020.01); *G06N 20/00* (2019.01); *G06Q 50/188* (2013.01)

(58) Field of Classification Search
CPC ......... G06Q 10/06; G06Q 00/00–99/00; G06F 1/00; G06F 40/00
USPC ............................................... 705/7.11–7.42
See application file for complete search history.

(56) References Cited

U.S. PATENT DOCUMENTS

| | | |
|---|---|---|
| 6,505,195 B1 | 1/2003 | Ikeda et al. |
| 7,519,589 B2 * | 4/2009 | Charnock ............... G06Q 30/02 |
| 7,617,164 B2 | 11/2009 | Burges et al. |
| 7,689,531 B1 | 3/2010 | Diao et al. |
| 8,411,935 B2 | 4/2013 | Eaton et al. |
| 8,429,103 B1 | 4/2013 | Aradhye et al. |
| 8,626,682 B2 | 1/2014 | Malik et al. |
| 8,868,472 B1 | 10/2014 | Lin et al. |

(Continued)

FOREIGN PATENT DOCUMENTS

| | | | |
|---|---|---|---|
| EP | 1946254 B1 * | 2/2012 | ............. G05B 17/02 |
| WO | 2009061917 A1 | 5/2009 | |

OTHER PUBLICATIONS

Catal, Cagatay & Diri, Banu. (2009). A systematic review of software fault prediction studies. Expert Systems with Applications. 36. 7346-7354. 10.1016/j.eswa.2008.10.027. (Year: 2009).*

(Continued)

Primary Examiner — Alan S Miller
Assistant Examiner — Jay-Ming Wang
(74) Attorney, Agent, or Firm — John W. Branch; Lowe Graham Jones PLLC

(57) ABSTRACT

Embodiments are directed to managing documents over a network. A machine learning (ML) engine analyzes a plurality of documents associated with actions that were performed previously. The ML engine determines critical events associated with the performance of the actions based on the plurality documents. The ML engine generates ML models based on the critical events to compute risk values that may be associated with the critical events. In response to a request to compute risk values associated with pending actions, the ML engine determines documents that are associated with the pending actions based on the request. The ML engine determines the critical events associated with pending actions based on the documents. The ML engine employs the ML models to generate the risk values based on the documents and the critical events. The ML engine provides the risk values in response to the request.

28 Claims, 10 Drawing Sheets

(56) References Cited

U.S. PATENT DOCUMENTS

| | | |
|---|---|---|
| 8,965,814 B1 | 2/2015 | Rangan |
| 9,235,812 B2 | 1/2016 | Scholtes |
| 9,384,450 B1 | 7/2016 | Cordes et al. |
| 9,922,285 B1 | 3/2018 | Glode et al. |
| 2005/0102130 A1 | 5/2005 | Quirk et al. |
| 2005/0228783 A1 | 10/2005 | Shanahan et al. |
| 2007/0239632 A1 | 10/2007 | Burges et al. |
| 2008/0101689 A1 | 5/2008 | Forman |
| 2008/0195577 A1* | 8/2008 | Fan .................. G06F 16/24545 |
| 2008/0249764 A1 | 10/2008 | Huang et al. |
| 2008/0249999 A1 | 10/2008 | Renders et al. |
| 2009/0240539 A1 | 9/2009 | Slawson et al. |
| 2009/0326919 A1 | 12/2009 | Bean |
| 2011/0004578 A1 | 1/2011 | Momma et al. |
| 2011/0213804 A1* | 9/2011 | Lee .................. G06F 16/3344 |
| | | 707/776 |
| 2011/0307422 A1 | 12/2011 | Drucker et al. |
| 2012/0117082 A1 | 5/2012 | Koperda et al. |
| 2012/0173477 A1 | 7/2012 | Coutts et al. |
| 2012/0215727 A1 | 8/2012 | Malik et al. |
| 2013/0031489 A1 | 1/2013 | Gubin et al. |
| 2013/0066818 A1 | 3/2013 | Assadollahi et al. |
| 2013/0238533 A1 | 9/2013 | Virkar et al. |
| 2014/0156567 A1 | 6/2014 | Scholtes |
| 2014/0172416 A1 | 6/2014 | Soroker et al. |
| 2014/0172417 A1 | 6/2014 | Monk, II et al. |
| 2014/0278755 A1* | 9/2014 | Eberl .................. G06F 16/244 |
| | | 705/7.29 |
| 2014/0280238 A1 | 9/2014 | Cormack et al. |
| 2014/0370480 A1 | 12/2014 | Sugibuchi et al. |
| 2015/0032645 A1 | 1/2015 | McKeown et al. |
| 2015/0294246 A1* | 10/2015 | Guven Kaya .... G06Q 10/06393 |
| | | 705/7.28 |
| 2015/0339572 A1 | 11/2015 | Achin et al. |
| 2015/0379429 A1 | 12/2015 | Lee et al. |
| 2016/0071022 A1 | 3/2016 | Bruno et al. |
| 2016/0117589 A1 | 4/2016 | Scholtes |
| 2016/0162802 A1 | 6/2016 | Chickering et al. |
| 2016/0358099 A1 | 12/2016 | Sturlaugson et al. |
| 2018/0039911 A1 | 2/2018 | Bezzubtseva et al. |
| 2018/0150454 A1 | 5/2018 | Sharma et al. |

OTHER PUBLICATIONS

Office Communication for U.S. Appl. No. 15/949,905 dated Jun. 27, 2018, pp. 1-19.

Office Communication for U.S. Appl. No. 15/949,905 dated Nov. 7, 2018, pp. 1-48.

Office Communication for U.S. Appl. No. 16/231,886 dated Feb. 28, 2019, pp. 1-28.

GitHub, Inc., Accord Project—Specification, Template Specification, "https://github.com/accordproject/techdocs/blob/master/docs/accordproject-specification.md," accessed Sep. 2018, p. 1-11.

Official Communication for U.S. Appl. No. 16/231,886 dated Jun. 21, 2019, pp. 1-23.

Official Communication for U.S. Appl. No. 16/231,842 dated Jul. 29, 2019, pp. 1-10.

Gibaja et al., "A Tutorial on Multilabel Learning", ACM Computing Surveys, vol. 47, No. 3, Article 52, Apr. 2015, pp. 52:1-52:38 (38 pages).

Freund et al., "An Efficient Boosting Algorithm for Combining Preferences", Journal of Machine Learning Research, 4, 2003, pp. 933-969. vol.

Official Communication for U.S. Appl. No. 16/231,842 dated Feb. 4, 2020, pp. 1-12.

International Search Report and Written Opinion for International Patent Application No. PCT/US2019/026850 dated Aug. 1, 2019, pp. 1-9.

International Search Report and Written Opinion for International Patent Application No. PCT/US2019/066986 dated Mar. 17, 2020, pp. 1-9.

Official Communication for U.S. Appl. No. 16/231,842 dated May 7, 2020, pp. 1-5.

Sun et al., "A Review of Natural Language Processing Techniques for Opinion Mining Systems", Information Fusion 26, 2017, pp. 10-25.

* cited by examiner

RISK PREDICTION BASED ON AUTOMATED ANALYSIS OF DOCUMENTS

TECHNICAL FIELD

The present invention relates generally to document management, and more particularly, but not exclusively, to analyzing documents and contracts.

BACKGROUND

Modern organizations are often required to enter into complex or expansive contracts between each other, vendors, suppliers, clients, or the like. In some cases, complex contracts may require a significant amount of effort to establish between parties. This effort may include common activities, such as, term negotiating, back-and-forth review, local government approval, or the like. Likewise, some contracts having particular characteristics, such as, parties, subject matter, locale, terms, value/cost, or the like, may be more likely to result in successful outcomes than some other contracts having different characteristics. For example, a routine service or production contract between two domestic organizations may have less risk than a contract to provide a raw material from a remote area prone to local disruption (e.g., political upheaval, logistical problems, extreme weather events, or the like). Often, organizations may have little insight into how the many characteristics of a complex contract, such as, parties, political conditions, choice of law, venues, forums, geographic locale, subject matter, value/cost, or the like, may impact the process of obtaining an executed contract as well as how contract characteristics impact the likelihood of contract performance. Accordingly, in some cases, it may be difficult for organizations to predict the time or effort it may take to obtain a particular contract. Likewise, it may be difficult for organizations to predict the potential of non-performance for mitigation planning. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
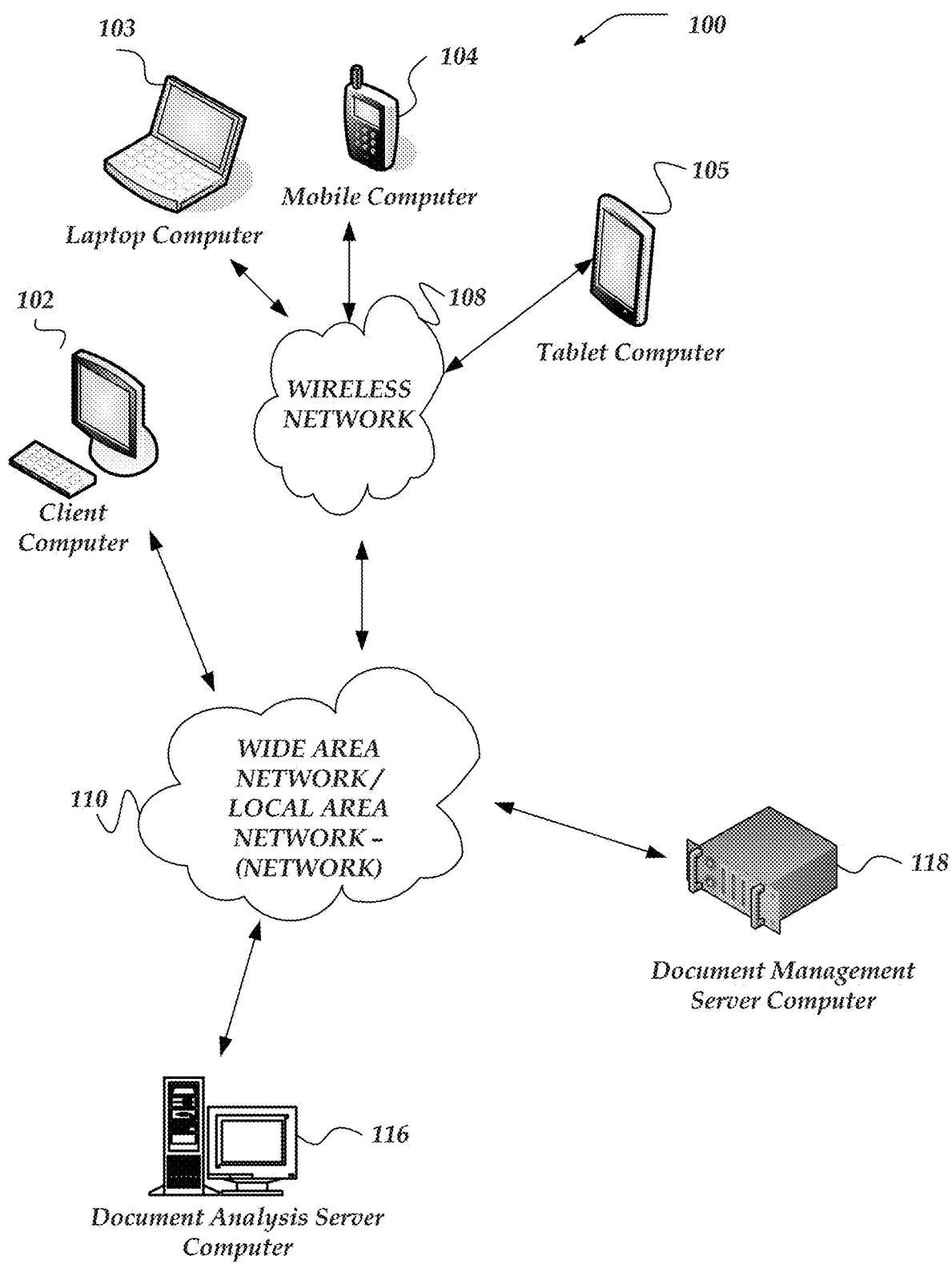
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, Kotlin, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine. Also, in some embodiments, one or more portions of an engine may be a hardware device, ASIC, FPGA, or the like, that performs one or more actions in the support of an engine or as part of the engine.

As used herein the term, "evaluator" refers to a package or bundle of computer readable instructions, configuration information, rules, patterns, regular expressions, condition logic, branching logic, software libraries, FPGAs, ASICs, or the like, or combination thereof that may be used to evaluate documents or document clauses. In some cases, evaluators may be used determine characteristics about a contract including one or more attributes or features of the contract. Various evaluators may be specialized for identifying or validating one or more categories of clauses or validating one or more document or contract types. In some embodiments, organizations or users may provide custom evaluators to identify clause categories or document types that may be unique to their organization.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

As used herein, the terms "machine learning model" or "ML model" refer to machine learning models that may be arranged for scoring or evaluating model objects (e.g., documents). The particular type of ML model and the questions it is designed to answer may depend on the application the ML model targets. ML models may include models arranged to use different training techniques or statistical techniques, including, linear regression, lasso regression, ridge regression, decision tree, random forest, logistic regression, or the like, or combination thereof. Further, in some embodiments, various heuristic methods or processes may be associated with a ML model. In some embodiments, configuration information may be employed to configure or select one or more ML model for a particular embodiment or application.

As used herein, the term "critical event" refers to various milestones in the life-cycle of the performance of one or more actions that may be associated with a document or class of documents. In some cases, critical events may include, execution, completion or termination, partial performance milestones, partial or final payment, or the like. The particular definition of the conditions or circumstances that trigger a critical event may vary depending on the document or the actions associated with the document.

As used herein, the term "risk value" refers to a risk value may represent the probability that one or more critical events may occur or not occur depending on the circumstances. In some embodiments, risk values may be positive or negative in the sense that they may be related to chance of a given critical event occurring or the chance that a given critical event does not occur.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing documents over a network. In one or more of the various embodiments, a machine learning engine may be instantiated to analyze a plurality of documents that are associated with one or more actions that were performed previously.

In one or more of the various embodiments, the machine learning engine may be arranged to determine one or more critical events that may be associated with the performance of the one or more actions based on the plurality documents.

In one or more of the various embodiments, the machine learning engine may be arranged to generate one or more ML models based on the one or more critical events and the plurality of documents such that the ML models are trained to predict one or more risk values that may be associated with the one or more critical events.

In response to a request to predict one or more risk values that may be associated with one or more pending actions, the machine learning engine may perform additional steps, as described below.

In one or more of the various embodiments, the machine learning engine may be arranged to determine one or more documents that are associated with the one or more pending actions based on the request.

In one or more of the various embodiments, the machine learning engine may be arranged to determine the one or more critical events that may be associated with the one or more pending actions based on the one or more documents such that the one or more critical events may be included in a data object that may reference the one or more documents to improve the performance of computing resources employed to execute the instructions.

In one or more of the various embodiments, the machine learning engine may be arranged to employ the one or more ML models to generate the one or more risk values based on the one or more documents and the one or more critical events.

In one or more of the various embodiments, the machine learning engine may be arranged to provide the one or more risk values in response to the request.

In one or more of the various embodiments, the machine learning engine may be arranged to receive one or more external inputs of different types of information, including one or more of political information, weather information, commodity supply information, or cultural information. And, in some embodiments, modifying the one or more ML models based on the external inputs.

In one or more of the various embodiments, the machine learning engine may be arranged to provide one or more heuristics that are configured to validate the one or more predicted risk values. And, in one or more of the various embodiments, modifying the one or more predicted risk values based on the one or more heuristics.

In one or more of the various embodiments, the machine learning engine may be arranged to monitoring one or more external input sources for updated external information. And, in some embodiments, updating the one or more risk values based on the updated external information.

In one or more of the various embodiments, the machine learning engine may be arranged to analyze another plurality of documents that may be associated with one or more other actions that are previously performed. And, in some embodiments, modifying the training of the one or more ML models to include training based on the other plurality of documents.

In one or more of the various embodiments, the machine learning engine may be arranged to automatically analyze one or more other pending actions. And, in some embodiments, in response to the one or more risk values exceeding a threshold value, automatically providing one or more notifications.

In one or more of the various embodiments, the machine learning engine may be arranged to determine a reputation score for each party to the one or more pending actions based on the one or more actions that were performed previously. And, in some embodiments, modifying the one or more risk values based on the reputation score for each party.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, document analysis server computer 116, document management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, document analysis server computer 116, document management server computer 118, or other computers.

Client computers 102-105 may further be configured to include a client application that enables an end-user to log into an end-user account that may be managed by another computer, such as document analysis server computer 116, document management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by document analysis server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, document analysis server computer 116, document management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of document analysis server computer 116, document management server computer 118 are described in more detail below in conjunction with FIG. 3. Although FIG. 1 illustrates document analysis server computer 116, document management server computer 118 each as a single computer, the innovations or embodiments are not so limited. For example, one or more functions of document analysis server computer 116, document management server computer 118, or the like, may be distributed across one or more distinct network computers. Moreover, in one or more embodiments, document analysis server computer 116, document management server computer 118 may be implemented using a plurality of network computers. Further, in one or more of the various embodiments, document analysis server computer 116, document management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client computer

Figure 2:
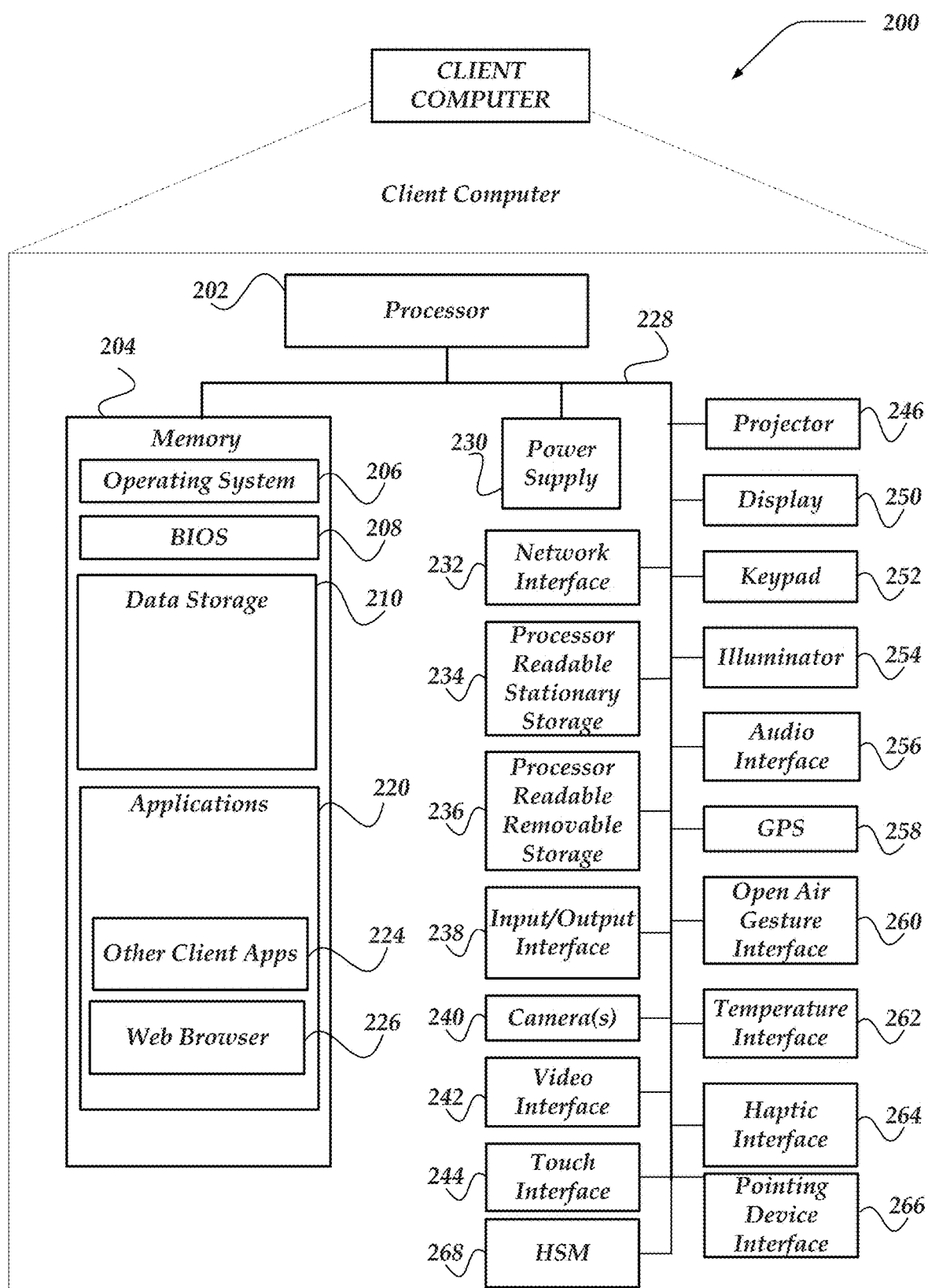
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in documents, clauses, evaluators, machine learning models, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, document management operations, document administration, document evaluation, document clause discovery, queries, searches, messages, notification messages, event messages, alerts, performance metrics, log data, API calls, or the like, combination thereof, with document analysis server computers or document management server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
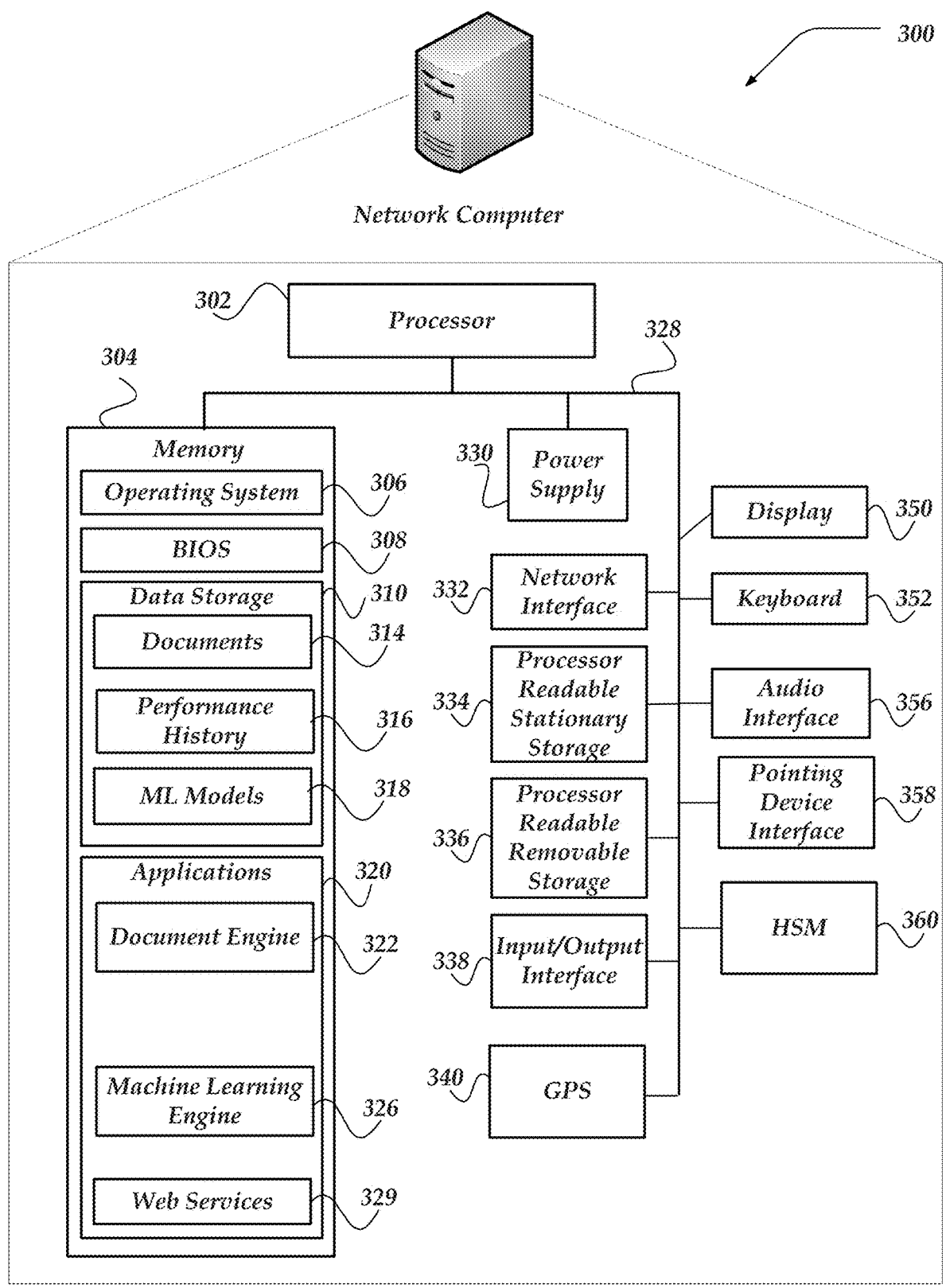
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of document analysis server computer 116, or document management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, document engine 322, machine learning engine 326, web services 329, or the like, may be arranged to employ geo-location information to select one or more localization features, such as, time zones, languages, currencies, currency formatting, calendar formatting, or the like. Localization features may be used in documents, clauses, clause meta-data, file systems, user-interfaces, reports, textual evaluators, semantic evaluators, as well as internal processes or databases. In at least one of the various embodiments, geo-location information used for selecting localization information may be provided by GPS 340. Also, in some embodiments, geolocation information may include information provided using one or more geo-location protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, documents 314, performance history 316, machine learning models 318, or the like. Documents 314 may store files, documents, versions, properties, meta-data, data structures, or the like, that represent one or more portions of a document, including raw documents or documents that have undergone additional analysis such as clause discovery or insight analysis. Performance history 316 may include information associated with actual performance of agreements that may be associated or represented by one or more of documents 314. Machine learning models 318 may store one or more machine learning models that may be trained for automated training and selection of models for document analysis. Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include document engine 322, machine learning engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, document engine 322, machine learning engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to document engine 322, machine learning engine 326, web services 329, or the like, may be provisioned and de-commissioned automatically.

Also, in one or more of the various embodiments, document engine 322, machine learning engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
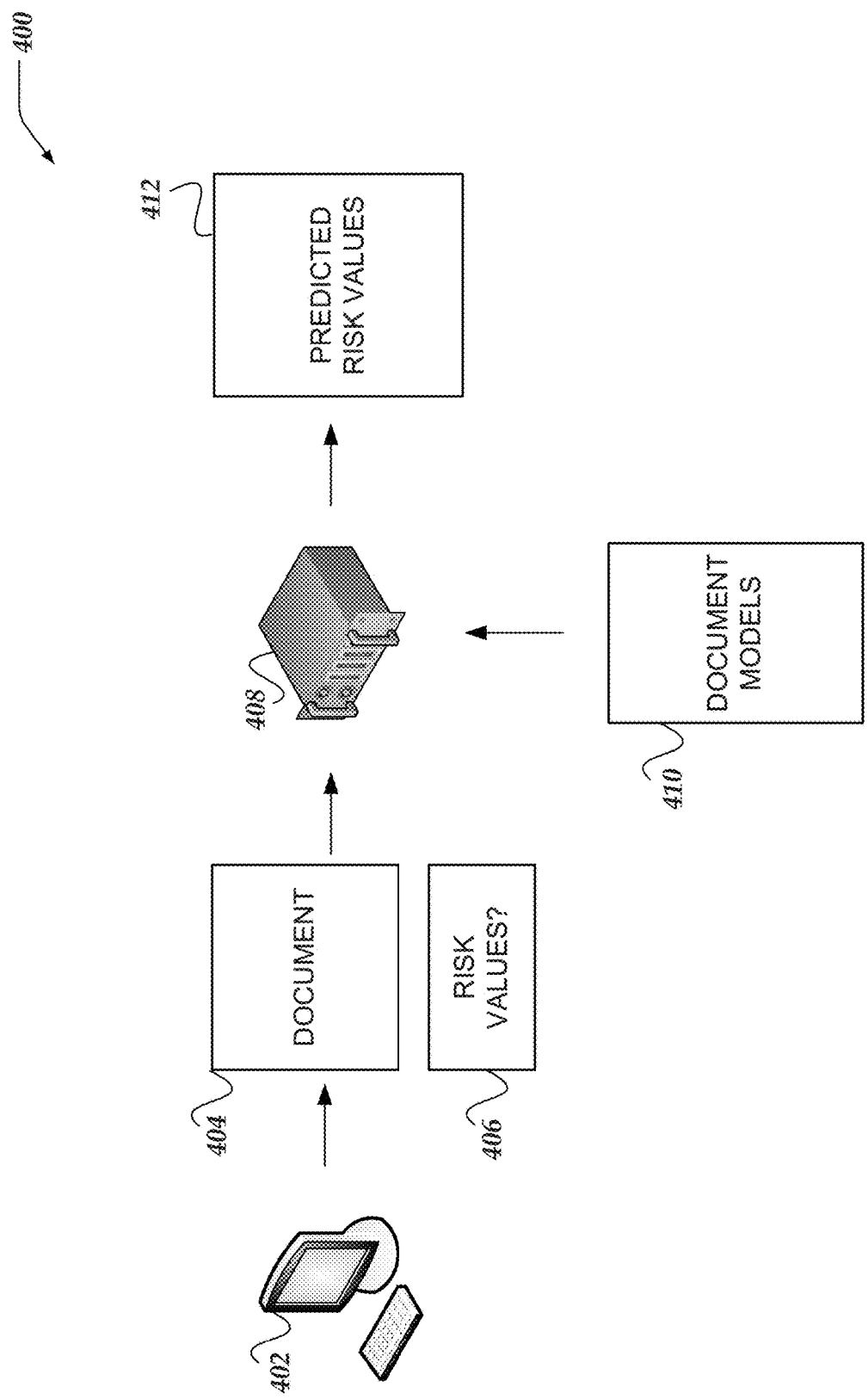
FIG. 4 illustrates a logical schematic of a system for risk prediction based on automated analysis of documents in accordance with one or more of the various embodiments.

FIG. 4 illustrates a logical schematic of system 400 for risk prediction based on automated analysis of documents in accordance with one or more of the various embodiments. In one or more of the various embodiments, a system, such as, system 400, may be arranged to respond to queries related to determining the likelihood of failure or success associated with the occurrence of one or more critical events that are associated with performance of an agreement that may be associated with one or more documents. In some embodiments, risk prediction may be the generation of one or more risk values associated with reaching the one or more critical events that may be associated with the performance of the underlying agreement. Accordingly, in some embodiments, users or organizations may obtain insights into the performance of the pending agreement.

In this example, in some embodiments, system 400 may include client computer 402 that a user or organization may use to provide one or more documents, such as, document 404 and one or more unknown risk values, such as, risk values 406 to a document analysis server computer, such as, document analysis server computer 408.

In one or more of the various embodiments, a machine learning engine may be instantiated on document analysis server computer 408 to perform actions to perform analysis of document 404. In some embodiments, the machine learning engine may be arranged to employ one or more ML models, such as, document models 410 to generate one or more predicted risk values, such as, predicted risk values 412.

In one or more of the various embodiments, the different ML models may include models arranged to use different training techniques or statistical techniques, including, linear regression, lasso regression, ridge regression, decision tree, random forest, logistic regression, neural networks, deep learning models, or the like, or combination thereof. Further, in some embodiments, various heuristic methods or processes may be employed as well. In some embodiments, a system, such as, system 400 may be arranged to employ configuration information, such as, rule based policies, pre-defined feature weights, pattern matching, scripts (e.g., computer readable instructions), or the like, to select ML models to answer a given query for a set of risk values. In some embodiments, this configuration information may be provided from various sources, including, configuration files, databases, user input, built-in defaults, or the like, or combination thereof.

Figure 5:
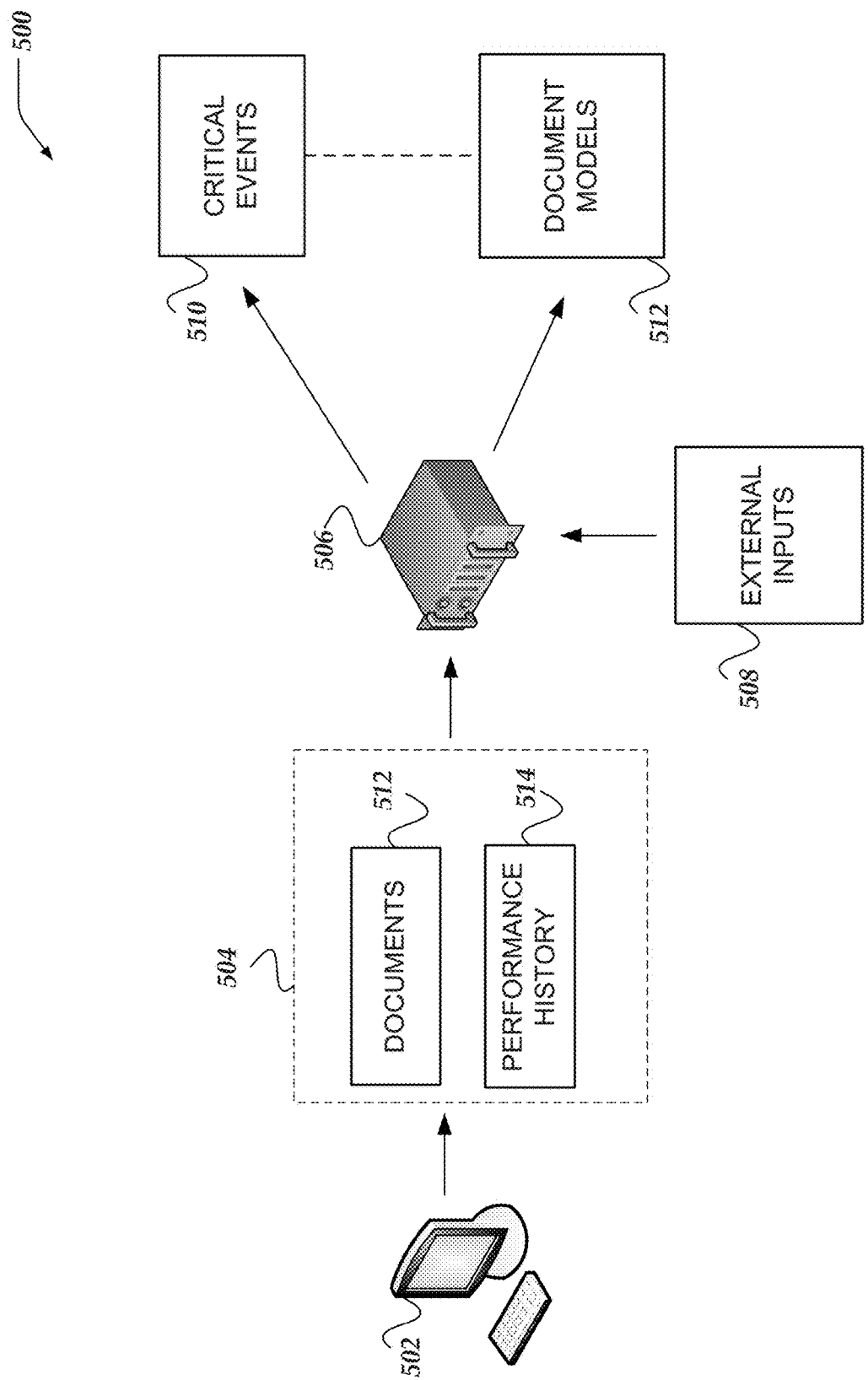
FIG. 5 illustrates a logical schematic of a system for generating document models for risk prediction based on automated analysis of documents in accordance with one or more of the various embodiments.

FIG. 5 illustrates a logical schematic of system 500 for generating document models for risk prediction based on automated analysis of documents in accordance with one or more of the various embodiments. In some embodiments, a system, such as, system 500 may include client computer 502 and document analysis server computer 506. In one or more of the various embodiments, a user may employ client computer 502 to provide organization data 504 to document analysis server computer 506.

In one or more of the various embodiments, a machine learning engine may be instantiated to employ organization data 504 and external inputs data 508 to determine one or more critical events, such as, critical events 510. Also, in one or more of the various embodiments, the machine learning engine may be arranged to generate one or more document models, such as, document models 512.

Accordingly, in one or more of the various embodiments, the machine learning engine may be arranged to employ document models 512 to generate one or more risk values associated with the performance of an agreement based on requests provided users.

In one or more of the various embodiments, performance history, such as performance history 514 may include one or more databases, data stores, or the like, that store performance history that may be associated with previous actions or previous documents. In some embodiments, performance history information may be provided via automatically generated log records, user generated information (e.g., comments, annotations, feedback, or the like), accounting/finance information, or the like. Also, in one or more of the various embodiments, performance history may be associated with the involved parties, similar actions, past actions, industry standards, industry trends, local governments, or the like In some embodiments, performance history may be pre-processed to provide aggregate values, statistical metrics, data sketches, or the like based on raw or disaggregated records.

In one or more of the various embodiments, a machine learning engine may be arranged to employ some or all performance history to train or validate one or more document models. For example, some or all of the performance history information may be pre-processed or otherwise transformed into machine readable formats suitable for training one or more document models using one or more machine learning systems.

Also, in one or more of the various embodiments, machine learning engines or document engines may be arranged to employ some or all of the performance history to provide information that may be used in one or more heuristics that may be associated with one or more document models. In one or more of the various embodiments, document engines or machine learning engines may be arranged to employ some or all of the performance history to provide reputation scores that may be associated with parties or organizations that may be associated with a document. Also, in some embodiments, reputation scores may be associated with parties, organization, or circumstances that may be indirectly related to a document, such as, time of year (e.g., weather considerations, seasonal production impacts, or the like), geopolitical conditions, or the like.

In one or more of the various embodiments, reputation scores may be considered weights or coefficients that may be employed to account for risks that may not be captured or accounted for by conventional machine learning modeling. For example, in one or more of the various embodiments, models that have been trained using more generalized information sources may underestimate the risk impact of one or more acute conditions, such as, recent political upheaval associated with one or more parties to an agreement. Accordingly, in this example, the reputation score associated with region suffering the political upheaval may be employed to modify the risk levels generated using the modeling techniques. Likewise, in some embodiments, if one or more parties associated with a document have developed a consistent track record of performance that exceeds the general expectations, the application of the reputation scores may reduce the risk as predicted by the ML models.

Figure 6:
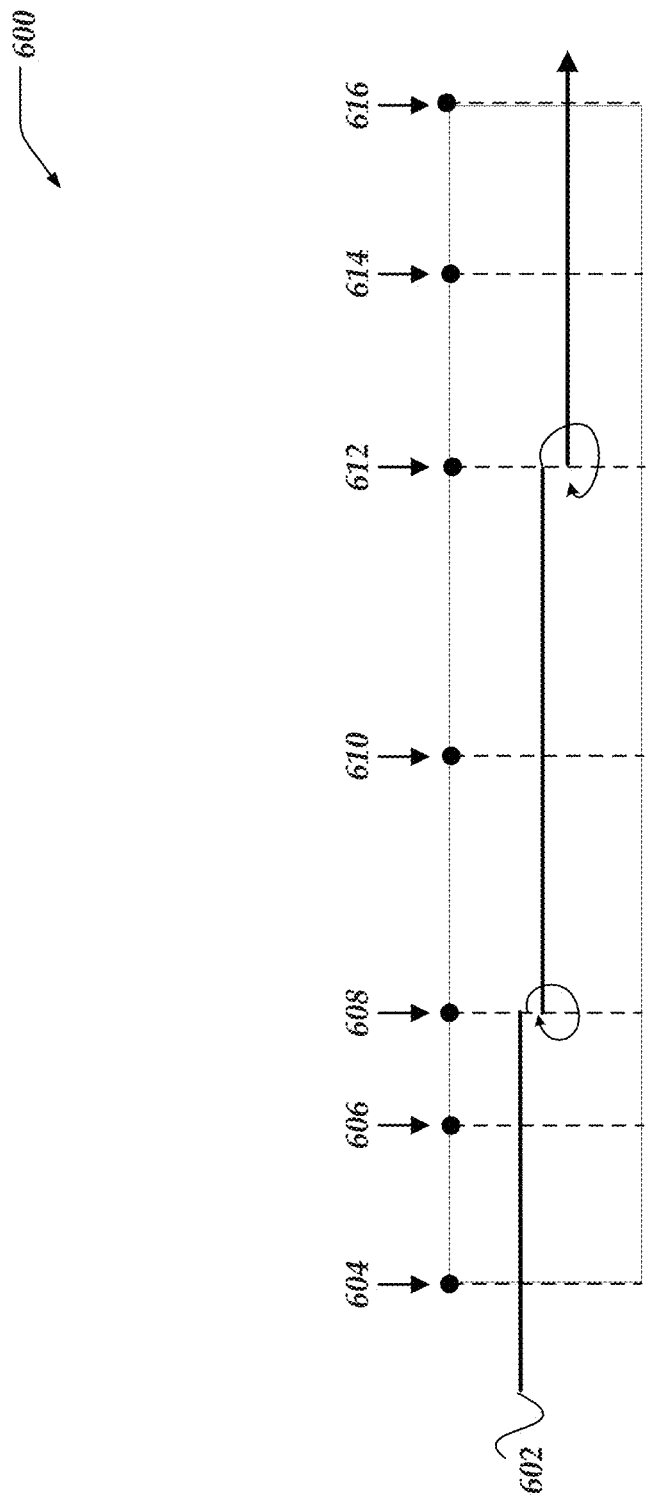
FIG. 6 illustrates a logical representation of a life cycles of one or more actions that include critical events in accordance with one or more of the various embodiments.

FIG. 6 illustrates a logical representation of agreement life cycle 600 that includes critical events associated with agreements in accordance with one or more of the various embodiments. In some embodiments, a life cycle of an agreement may be associated with one or more critical events that correspond the performance of the agreement. In this example, time line 602 represents a time line associated with the performance of the agreement. In this example, time line 602 represents the passage of time over the lifetime of an agreement made between two or more parties. Accordingly, critical events 604-616 represent the various critical events that may be expected to occur during the lifetime of agreement 602.

In this example, the lifecycle of agreement 602 may include various critical events associated with the performance of the agreement, including: critical event 604, which may represent the initial communication between the involved parties; critical event 606 which may represent the execution of a letter of intent between the involved parties; critical event 608 which may represent actual execution or final authorization of the agreement; critical event 610 may represent partial performance of the agreement, such as, delivery of a prototype, receipt of partial payment, or the like; critical event 612 may represent repeated on going performance actions, such as, delivery of products, completion of projects, payment for partial performance, or the like; critical event 614 which represent performance of all of the actions associated with the agreement; critical event 616, which may represent the end of the agreement; or the like.

In one or more of the various embodiments, critical events may be considered milestones or conditions for the agreement to succeed. In one or more of the various embodiments, critical events may be associated with various milestones associated with a given agreement or agreement types. Some milestones may be associated with one or more critical events while other milestones may be unassociated with critical events.

In some embodiments, critical events may be identified or sorted from other milestones based on configuration information, machine learning, or the like, or combination thereof. Accordingly, some critical events may be discovered through the application of one or more rules, heuristics, machine learning modeling, or the like. Alternatively, in one or more of the various embodiments, one or more critical events may be imposed by the agreement itself, such as, start dates, delivery dates, payment due dates, or the like, or combination thereof.

In one or more of the various embodiments, some critical events may be associated with more than one actions or transactions. Accordingly, in one or more of the various embodiments, a critical event may be configured to represent two or more of the same actions, a sequence of actions, or the like. For example, in some embodiments, critical event 608 may represent making available one or more documents associated with the agreement for execution or acknowledgement by all the parties. Accordingly, in this example, critical events that take time to complete may be represented by a break in agreement time line 602.

Also, in one or more of the various embodiments, one or more critical events may be associated with performance actions that may be repeated a defined number times before the critical event may be considered satisfactorily completed. For example, critical event 612 may represent the performance action of periodic deliveries of a good or service. Accordingly, in this example, if critical event 612 represents partial performance milestones, such as, periodic deliveries of goods that may repeat until a defined condition, such as, amount of goods transferred, elapsed time, notice of cancelation, or the like. Thus, in some embodiments, a single critical event may represent two or more milestones or performance actions.

In one or more of the various embodiments, the particular critical events associated with an agreement may vary depending on a variety of factors associated with the parties, content, or subject matter of the agreements. Additionally, in some embodiments, critical events may include milestones associated with the performance of the agreement. In one or more of the various embodiments, critical events may be associated with a variety of terms or conditions that indicates that the critical event in the lifecycle of an agreement has occurred.

In some embodiments, the performance of an agreement may be influenced by one or more additional factors that may include, involved parties, political conditions, choice of law, venues, forums, geographic locale, weather conditions, subject matter, value/cost, or the like. For example, in some embodiments, government regulations (e.g., tax regulations or trade regulations) associated with the involved parties or performance of the agreement may introduce additional milestones that may be critical events.

Further, in one or more of the various embodiments, performance history that may be associated with the involved parties, similar agreements, past agreements, industry standards, industry trends, local governments, or the like, may be employed by a machine learning engine to influence the determination of critical events for a given agreement.

Generalized Operations

FIGS. 7-10 represent generalized operations for risk prediction based on automated analysis of documents in accordance with one or more of the various embodiments. In one or more of the various embodiments, processes 700, 800, 900, and 1000 described in conjunction with FIGS. 7-10 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-10 may be used risk prediction based on automated analysis of documents in accordance with at least one of the various embodiments or architectures such as those described in conjunction with FIGS. 4-6. Further, in one or more of the various embodiments, some or all of the actions performed by processes 700, 800, 900, and 1000 may be executed in part by document engine 322, or machine learning engine 326 running on one or more processors of one or more network computers.

Figure 7:
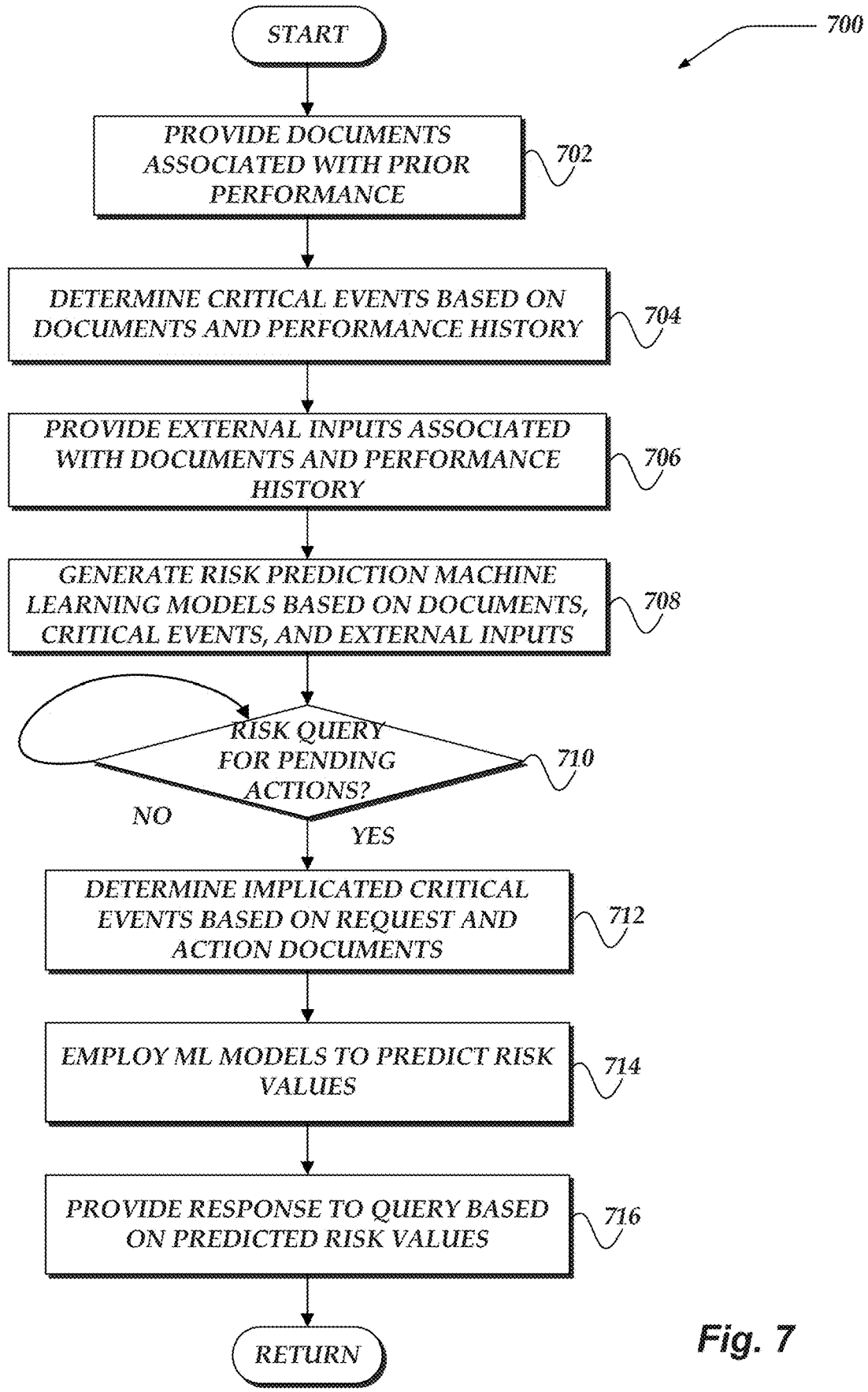
FIG. 7 illustrates an overview flowchart of a process for risk prediction based on automated analysis of documents in accordance with one or more of the various embodiments.

FIG. 7 illustrates an overview flowchart of process 700 for risk prediction based on automated analysis of documents in accordance with one or more of the various embodiments. After a start block, at block 702, in one or more of the various embodiments, one or more documents that may be associated with one or more previously performed agreements may be provided to a machine learning engine, such as, machine learning engine 326. As described above, an organization may provide documents, including completed contracts, historical contracts, archived contracts, or the like, as well as various related or supporting documents, including, work orders, invoices, letters of intent, job/work descriptions, other documents, or the like.

In one or more of the various embodiments, the organization may provide digital copies of some or all of the documents. For example, some or all of the documents may be provided via digital media. Alternatively, or concurrently, in some embodiments, the organization may share access to some or all of the documents with the document engine. For example, in some embodiments, an organization may provide a document engine access to document management tools that enable the document engine to access the documents.

In one or more of the various embodiments, information about some or all of the documents may be provided in lieu of providing complete documents. In some embodiments, document meta-data, abstracts, outlines, summaries, annotations, data sketches, or the like, or combination thereof, may be provided. However, in the interest of brevity and clarity the term documents is used for both complete/full documents and document abstracts, summaries, meta-data, or the like.

At block 704, in one or more of the various embodiments, the machine learning engine may be arranged to determine one or more critical events based on the provided documents, the provided performance history, or the like. As described in more detail below (See, FIG. 8), in one or more of the various embodiments, various critical events associated with the previously performance agreements may be determined for the various documents. These may include one or more automatically generated critical events as well as one or more critical event included by users or operators.

In one or more of the various embodiments, critical events for previously performed agreements may be associated with date information, such as, duration, start date, finish date, or the like. In one or more of the various embodiments, correlations discovered between the performance history and the agreement documents may be employed to compute date information that may be associated with a critical event.

At block 706, in one or more of the various embodiments, the machine learning engine may be arranged to obtain information associated with one or more external sources or external considerations. This information generally includes information associated with facts or conditions that may be separate from the documents or performance history that may be provided. However, in some embodiments, some or all of the external information may be provided with the documents or performance information that may be associated with previously performed agreements.

In one or more of the various embodiments, external inputs may include various information, such as, political stability of countries relevant to the agreement, weather, economic factors, local exchange rates, local interest rates, minimum wage, labor scarcity, local holidays, or the like. For example, in some embodiments, weather information may be provided from one or more weather services. Likewise, for example, political or social sentiment information may be provided by one or more services that monitor social media activity, local new reports, or the like.

In some embodiment, external inputs may include production or inventory information that may impact performance of agreements. For example, if the agreement calls for the delivery of 100,000 widgets in 6 months from supplier that historically produces 100,000 widgets per year, the risk levels for reaching the completion critical event may be increased because the agreement requires the supplier to double their historical production rate. Thus, while the parties may be comfortable entering into this agreement, the lack of prior success history may increase the risk that the terms of the agreement may not be met.

In one or more of the various embodiments, external inputs from various sources may be pre-processed into data formats that are suitable for using with ML models. Accordingly, in one or more of the various embodiments, document engines, or the like, may be arranged to employ data formatting or data normalizing rules based on configuration information. For example, configuration information may prescribe or provide one or more computer readable instructions that may be executed to normalize weather information from a particular source. Also, for example, other weather sources may be associated with different data formatting or data normalizing rules as per the configuration information.

At block 708, in one or more of the various embodiments, the machine learning engine may be arranged to employ machine learning to generate one or more models that may be used to computerisk values for critical events that may be associated agreements based on the historical record associated with the previously performed agreements.

In one or more of the various embodiments, ML models may be directed to predicting one or more critical events. Likewise, in some embodiments, ML models may be directed to different categories of agreements. Accordingly, in one or more of the various embodiments, ML models may be trained to expect certain inputs (e.g., features associated with a pending agreement) to compute certain risk values. For example, ML models associated with service agreements may be trained separate from ML models associated with production agreements.

Further, in some embodiments, one or more ML models may be trained for particular common critical events, such as, start of agreement, date of execution, or the like. Accordingly, in one or more of the various embodiments, in some cases, the same ML models may be used for different types of agreements for predicting some critical events.

Accordingly, in one or more of the various embodiments, ML models may be generated or trained to receive input values derived from an agreement or agreement documents and compute one or more risk values that are associated with one or more critical events of the agreement.

At decision block 710, in one or more of the various embodiments, if a risk query for one or more pending agreements is provided, control may flow to block 712; otherwise, in some embodiments, control may loop back to decision block 710. As described above, in some embodiments, the machine learning engine may be provided one or more requests that include a query to provide one or more computed risk values associated with the occurrence, non-occurrence, success, failure, or the like, of one or more critical events of a pending agreement. In one or more of the various embodiments, the risk query may include one or more documents or references to one or more documents that may be associated with the pending agreement. Accordingly, in some embodiments, the machine learning engine may be arranged to obtain or otherwise access these agreement documents to enable the query to be answered.

In some embodiments, a risk value may represent the probability that one or more critical events may occur or not occur depending on the circumstances. In some embodiments, risk queries may provide risk values that may be positive or negative in the sense that they may be related to chance of a given critical event occurring or the chance that a given critical event does not occur.

At block 712, in one or more of the various embodiments, the machine learning engine may be arranged to determine one or more implicated critical events based on the query request or the one or more agreement documents. In one or more of the various embodiments, the query request may implicitly or explicitly be associated with one or more critical events associated with a pending agreement. In some embodiments, at block 704, the document engine or the machine learning engine have determined one or more critical events that should be associated with agreements or agreement types based on past performed agreements. Accordingly, in some embodiments, the machine learning engine may a list of "predictable" critical events that a user may select from.

At block 714, in one or more of the various embodiments, the machine learning engine may be arranged to employ the machine learning models to predict one or more of the risk values included in the query. In one or more of the various embodiments, the machine learning engine may be arranged to select one or more ML models based on the type of pending agreement, input features of the pending agreement, the request outputs (e.g., different ML models may be used for predicting different critical events), the organization, user preferences, or the like.

In some embodiments, more than one ML model may be employed to answer the same query. In some embodiment, some of them may be used to predict different critical events while others may be used to predict the same critical events. Accordingly, in some embodiments, if more than one machine learning model is used to compute the same risk value, the user may be presented with multiple predicted values so they may choose among them. For example, in some embodiments, model A may compute a risk value associated with the occurrence of critical event X and model B may compute a different risk value associated with the occurrence of critical event X. Accordingly, in some embodiments, a user interface may be arranged to enable the user to select which risk value should be given consideration.

At block 716, in one or more of the various embodiments, the machine learning engine may be arranged to provide a response to query that includes the one or more predicted risk values. In some embodiments, an organization may be enabled to configured one or more rules that may automatically evaluate predicted risk values and perform some actions based on the values. Likewise, the response may be a report, notification, log entry, alarm, or the like, depending on the risk value as defined in configuration information.

Next, in some embodiments, control may be returned to a calling process.

Figure 8:
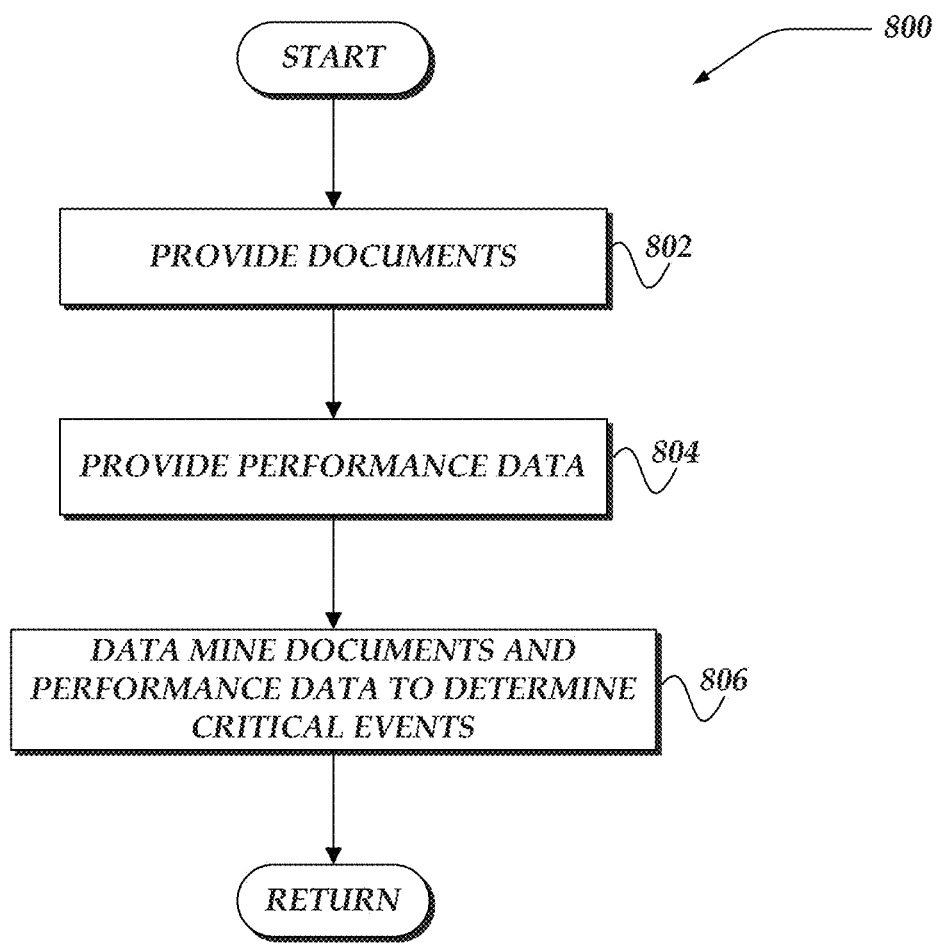
FIG. 8 illustrates a flowchart of a process for determining critical events for automated analysis of documents in accordance with one or more of the various embodiments.

FIG. 8 illustrates a flowchart of process 800 for determining critical events for automated analysis of documents in accordance with one or more of the various embodiments. After a start block, at block 802, in one or more of the various embodiments, a plurality of documents that may be associated with one or more previously performed agreements may be provided to a machine learning engine. In this context, for some embodiments, action agreement documents are documents that may be associated with a particular agreement. For example, this may include one or more of contract documents, work orders, invoices, addendums, status reports, or the like. In some cases, there may be a single agreement document, such as, a contract document that may represent the pending agreement.

In some embodiments, a document analysis platform may provide a user interface that enables an operator to select an agreement or agreement documents that may be provided to the machine learning engine for analysis. In other embodiments, the document analysis platform may be arranged to automatically process agreement documents that may be retrieved from a document data store (e.g., document management system).

At block 804, in one or more of the various embodiments, performance information that may be associated with the provided documents or the associated performed agreements may be provided. In one or more of the various embodiments, performance information may be information related to the actions taken during the performance of an agreement. In some embodiments, this may include one or more agreement documents, such as, invoices, work orders, acceptance certificates, or the like.

In some embodiments, performance information may include information directly from one or more log files or journals that may be associated with performance actions associated with the agreement. For example, a finance engine may be arranged to generate a journal entry for each payment or charge that may be associated with an agreement. Accordingly, the machine learning engine may be arranged to identify correlations between the performance information and clauses or values in the agreement document. For example, if a journal shows the date that a first payment (e.g., partial payment) was or a first delivery (e.g., partial performance), the machine learning engine may be able to associate that payment or delivery with critical event, such as, received first partial payment critical event, and so on.

In one or more of the various embodiments, performance information may include information about external circumstances, such as, local regulations, that may influence the critical events that may be associated with an agreement. In one or more of the various embodiments, regulatory or compliance requirements may translate to additional risk, both from the potential for delay and from other factors, that may be computed and include to the document model. For example, if a local regulation requires a 60-day public comment period before a part of the agreement may be performed, the relevant critical events or associated risk values related may be modified automatically to account for the 60-day waiting period.

At block 806, in one or more of the various embodiments, the machine learning engine may be arranged to data mine the provided documents and performance information to determine one or more critical events. In one or more of the various embodiments, critical events are agreement life-cycle milestones that may be inferred from some agreement documents. For example, if the agreement documents have a well-defined first order delivery deadline, the machine learning engine may automatically associate a critical event with the deadline. Other, critical events may be inferred easily from the text of the agreement documents, as well, such as, when the agreement starts, or the like. In general, clause discovery or other document analysis tools may provide a set candidate critical events for an agreement. Further, in one or more of the various embodiments, organizations may define one or more critical events that may be relevant for the organization.

Also, in one or more of the various embodiments, because critical events are generally related to the performance of an agreement rather than the text of the agreement documents, some critical events may be associated with one or more agreement actions (e.g., receiving payments, passing inspections, obtaining permits, or the like) rather than being associated with a particular part of a document. However, in one or more of the various embodiments, analysis of the agreement documents may define parameters or values that may be associated with the critical events, including, performance deadlines, pay amounts, delivery quantities, or the like. For example, a critical event may be configured to represent when a first partial performance is made even though the agreement is defined in terms of full performance. Thus, in this example, the critical event may be related to a first partial performance based on information derived from the agreement documents even first partial performance is not explicitly part of the agreement. Next, control may be returned to a calling process.

Figure 9:
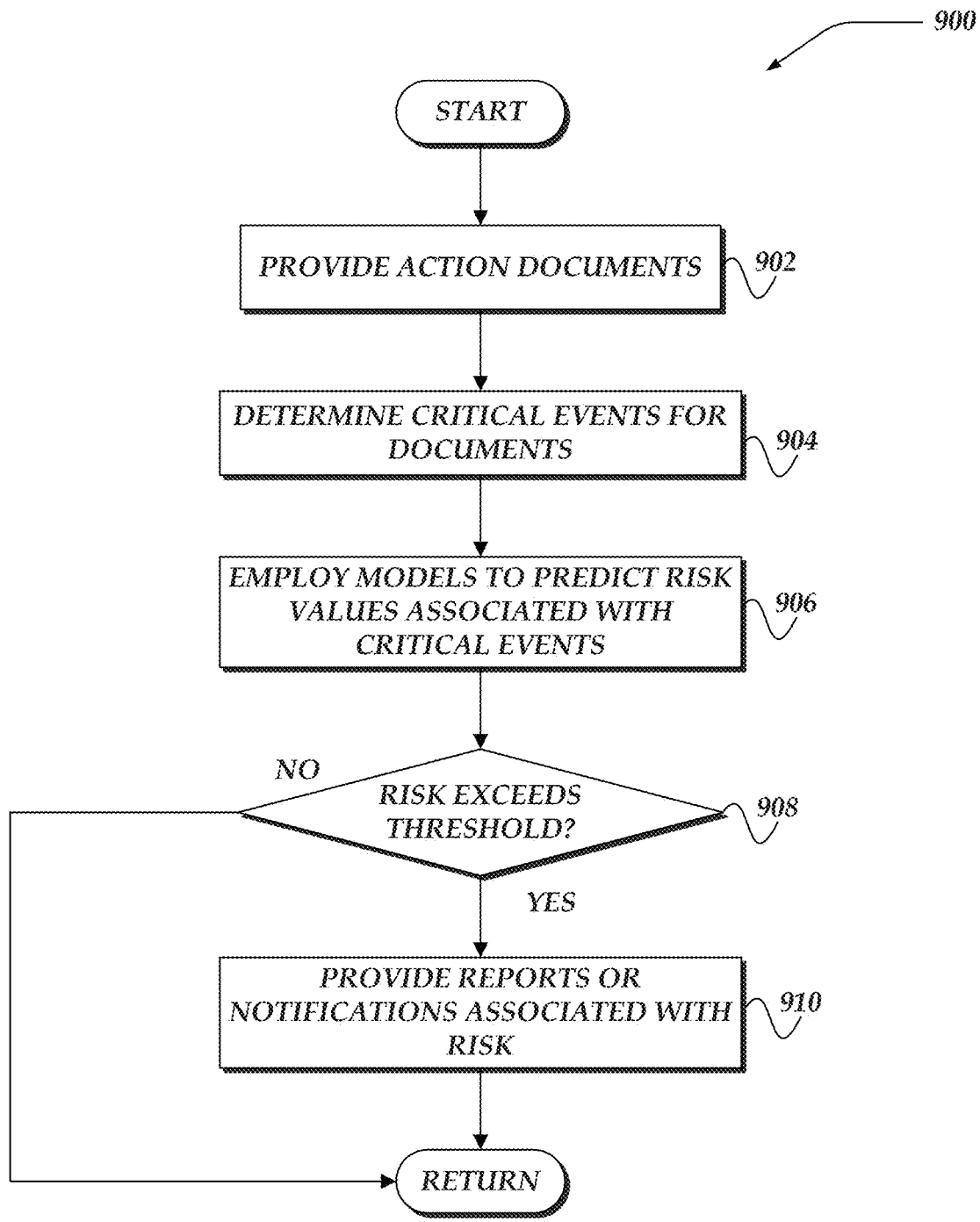
FIG. 9 illustrates a flowchart of a process for predicting risk values for automated analysis of documents in accordance with one or more of the various embodiments.

FIG. 9 illustrates a flowchart of process 900 for predicting risk values for automated analysis of documents in accordance with one or more of the various embodiments. After a start block, at block 902, in one or more of the various embodiments, one or more agreement documents may be provided to a machine learning engine. In this context, for some embodiments, agreement documents are documents that may be associated with a particular agreement. For example, this may include one or more of contract documents, work orders, invoices, addendums, status reports, or the like. In some cases, there may be a single agreement document, such as, a contract document that may represent the pending agreement.

In some embodiments, a document analysis platform may provide a user interface that enables an operator to select an agreement or agreement documents that may be provided to the machine learning engine for analysis. In other embodiments, the document analysis platform may be arranged to automatically process agreement documents that may be retrieved from a document data store (e.g., document management system).

At block 904, in one or more of the various embodiments, the machine learning engine may be arranged to determine one or more critical events that may be associated with the agreement based on the agreement documents. In one or more of the various embodiments, each agreement may be associated with various critical events. In some embodiments, some critical events or critical event types may be unique to certain kinds of agreements or agreement documents. Also, in some embodiments, some other critical events or critical event types may be common to one or more agreements or agreement documents.

In some embodiments, one or more of the agreement documents may be annotated with meta-data that identifies or calls-out one or more critical events that may be associated with an agreement. For example, during an intake phase agreement documents may be scanned or parsed to determine the critical events that may be associated with an agreement. Accordingly, in some embodiments, the critical event definitions may be stored with a document.

In some embodiments, one or more critical events may be determined from the content of the agreement documents. In one or more of the various embodiments, during intake or creation of the agreement documents, a machine learning engine may be arranged to classify various parts or clauses of the agreement documents. Accordingly, in some embodiments, one or more particular critical events may be associated with particular clauses that may comprise the agreement documents.

In one or more of the various embodiments, the machine learning engine may be arranged to recommend one or more critical events that a user may associate with a document. In some embodiments, recommending critical events may be employed if the machine learning engine is unable unambiguously categorize or classify one or more clauses in a document.

As described above, in one or more of the various embodiments, critical events may represent various milestones in the life-cycle an agreement. In some embodiments, these may include, execution, completion or termination, partial performance milestones, partial or final payment, or the like.

At block 906, in one or more of the various embodiments, the machine learning engine may be arranged to employ one or more document models to compute risk values that may be associated with the one or more critical events. In one or more of the various embodiments, the machine learning engine may employ one or more of the trained ML models to generate risk values for the critical events. In some embodiments, the ML models may receive input information that includes the agreement documents, meta-data describing features of the agreement document, one or more completed or expired critical events, partial performance information, or the like.

Accordingly, in one or more of the various embodiments, the ML models may provide predicted risk values for one or more critical events that may be of interest to the user. In other embodiments, risk values for all of the critical events for a document may be predicted. In some embodiments, if risk value predictions were previously made for the pending agreement under analysis, they may be updated to reflect updated ML models or other changes in circumstances that may impact the risk values associated with critical events.

At decision block 908, in one or more of the various embodiments, if one or more risk values exceeds a defined threshold value, control may flow to block 910; otherwise, control may be returned to a calling process. In one or more of the various embodiments, machine learning engine may be arranged to employ configuration information to associate one or more actions with critical event risk levels. Accordingly, in some embodiments, the one or more actions may be triggered in response to various critical-event/risk-value associations depending the configuration information. For example, the configuration information may define that an alarm notification for a given critical event may be sent to one or more responsible persons is the risk level drops below a defined threshold value. Next, control may be returned to a calling process.

Figure 10:
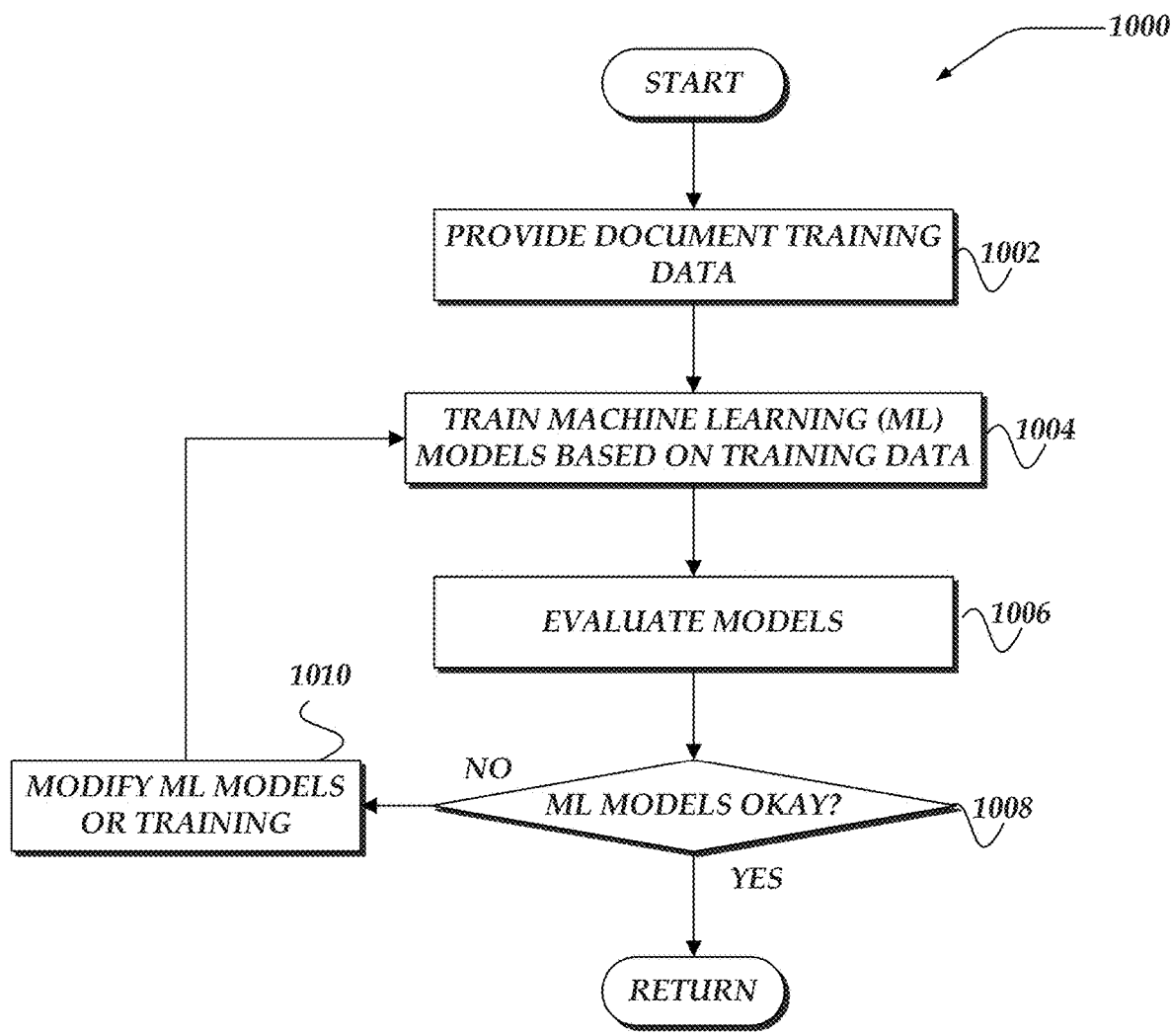
FIG. 10 illustrates a flowchart of a process for training machine learning models used for risk prediction based on automated analysis of documents in accordance with one or more of the various embodiments.

FIG. 10 illustrates a flowchart of process 1000 for training machine learning models used for risk prediction based on automated analysis of documents in accordance with one or more of the various embodiments. After a start block, at block 1002, in one or more of the various embodiments, a machine learning engine may be provided document training data. In one or more of the various embodiments, the machine learning engine may be provided training data in the form of a large collection of documents of a known quality and a known document type.

In some embodiments, the training data may have previously been classified or evaluated. Accordingly, in one or more of the various embodiments, the training data may include labels, tags, meta-data, confidence scores, document quality scores, activity journal records, or the like.

Accordingly, the documents in the training data may be associated with meta-data generated by the document engine during preprocessing or initial intake processing. In some embodiments, the meta-data may include label information that may be used by the machine learning engine for training one or more machine learning (ML) models.

Alternatively, in one or more of the various embodiments, some of the training data may be unlabeled or partially labeled. Note, in some embodiments, some or all of the training data may be documents stored in a document management system or a document repository.

At block 1004, in one or more of the various embodiments, the machine learning engine may be arranged to train one or more ML models using the training data. In one or more of the various embodiments, the training methods may depend on the type of ML model being trained.

At block 1006, in one or more of the various embodiments, the machine learning engine may be arranged to evaluate the trained ML models. In one or more of the various embodiments, a portion of the training data that has known characteristics may be evaluated using the ML models. Accordingly, in one or more of the various embodiments, ML models that compute risk values with an accuracy rate that exceeds a defined threshold value may be considered sufficiently trained. Note, in some embodiments, different ML models may be associated with different accuracy threshold values. For example, some ML models types may be intended for gross classification or prediction that does not require precision accuracy. In some embodiments, other ML models that may require increased accuracy or precision may be associated with threshold values that correspond to increased accuracy or precision At decision block 1008, in one or more of the various embodiments, if the trained ML models are sufficiently trained, control may be returned to a calling process; otherwise, control may flow to block 110. In one or more of the various embodiments, machine learning engines may be arranged to compare one or more defined conditions with the results produced by the ML models. In some embodiments, different ML models or different types of ML model types may be associated with one or more rules or condition sets that may be evaluated to determine if a ML model is trained sufficiently. Accordingly, in one or more of the various embodiments, machine learning engines may be arranged to employ configuration information to determine the criteria for determining if a given ML model or ML model type is sufficiently trained.

At block 1010, in one or more of the various embodiments, the one or more of the ML models or one or more of the training routines may be modified. In one or more of the various embodiments, the machine learning engine may be arranged to automatically modify one or more parameters of the one or more ML models that require retraining. In other embodiments, the machine learning engine may enable data scientists to modify the ML models or select different ML models. Next, in some embodiments, control may loop back to block 1004, to re-train the ML models.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing documents over a network using one or more processors that execute instructions to perform steps, comprising:
 instantiating a machine learning (ML) engine to perform actions, including:
  analyzing a plurality of documents that are associated with one or more actions that were performed previously;
  determining one or more critical events that are associated with the performance of the one or more actions based on the plurality documents, wherein a portion of the one or more critical events are discovered through application of one or more of rules, heuristics, or ML modeling to the plurality of documents or the one or more actions associated with the plurality of documents;
  generating one or more ML models based on the one or more critical events and the plurality of documents, wherein the ML models are trained to predict one or more risk values that are associated with the one or more critical events until an accuracy rate of the predicted one or more risk values meets one or more defined thresholds; and
   in response to a request to provide one or more risk values that are associated with one or more pending actions, performing further steps, including:
    determining one or more documents that are associated with the one or more pending actions based on the request;
    determining the one or more critical events that are implicitly and explicitly associated with the one or more pending actions based on the request and the one or more documents, wherein the one or more implicit and explicit critical events are included in a data object that references the one or more documents to improve the performance of computing resources employed to execute the instructions;
    employing the one or more ML models to generate the one or more risk values based on the one or more documents, the predicted one or more risk values and the one or more implicit and explicit critical events; and
    providing the one or more risk values in response to the request.

2. The method claim 1, wherein the ML engine performs further steps, including:
 receiving one or more external inputs of different types of information, including one or more of political information, weather information, commodity supply information, or cultural information; and
 modifying the one or more ML models based on the external inputs.

3. The method of claim 1, wherein the ML engine performs further steps, including:
 providing one or more heuristics that are configured to validate the one or more predicted risk values; and
 modifying the one or more predicted risk values based on the one or more heuristics.

4. The method of claim 1, wherein the ML engine performs further steps, including:
 monitoring one or more external input sources for updated external information; and
 updating the one or more risk values based on the updated external information.

5. The method of claim 1, wherein the ML engine performs further steps, including:
 analyzing another plurality of documents that are associated with one or more other actions that are previously performed; and
 modifying the training of the one or more ML models to include training based on the other plurality of documents.

6. The method of claim 1, wherein the ML engine performs further steps, including:
 automatically analyzing one or more other pending actions; and
 in response to the one or more risk values exceeding a threshold value, automatically providing one or more notifications.

7. The method of claim 1, wherein the ML engine performs further steps, including:
 determining a reputation score for each party to the one or more pending actions based on the one or more actions that were performed previously; and
 modifying the one or more risk values based on the reputation score for each party.

8. A system for managing documents comprising:
 a network computer, comprising:
  a transceiver that communicates over the network;
  a memory that stores at least instructions; and
  one or more processors that execute instructions that perform steps, including:
   instantiating a machine learning (ML) engine to perform actions, including:
    analyzing a plurality of documents that are associated with one or more actions that were performed previously;
    determining one or more critical events that are associated with the performance of the one or more actions based on the plurality documents, wherein a portion of the one or more critical events are discovered through application of one or more of rules, heuristics, or ML modeling to the plurality of documents or the one or more actions associated with the plurality of documents;
    generating one or more ML models based on the one or more critical events and the plurality of documents, wherein the ML models are trained to predict one or more risk values that are associated with the one or more critical events until an accuracy rate of the predicted one or more risk values meets one or more defined thresholds; and
     in response to a request to provide one or more risk values that are associated with one or more pending actions, performing further steps, including:
      determining one or more documents that are associated with the one or more pending actions based on the request;

determining the one or more critical events that are implicitly and explicitly associated with the one or more pending actions based on the request and the one or more documents, wherein the one or more implicit and explicit critical events are included in a data object that references the one or more documents to improve the performance of computing resources employed to execute the instructions;

employing the one or more ML models to generate the one or more risk values based on the one or more documents, the predicted one or more risk values, and the one or more implicit and explicit critical events; and providing the one or more risk values in response to the request; and a client computer, comprising:
a transceiver that communicates over the network;
a memory that stores at least instructions; and
one or more processors that execute instructions that perform actions, including:
providing the request to predict the one or more risk values.

9. The system of claim 8, wherein the ML engine performs further steps, including:
receiving one or more external inputs of different types of information, including one or more of political information, weather information, commodity supply information, or cultural information; and
modifying the one or more ML models based on the external inputs.

10. The system of claim 8, wherein the ML engine performs further steps, including:
providing one or more heuristics that are configured to validate the one or more predicted risk values; and
modifying the one or more predicted risk values based on the one or more heuristics.

11. The system of claim 8, wherein the ML engine performs further steps, including:
monitoring one or more external input sources for updated external information; and
updating the one or more risk values based on the updated external information.

12. The system of claim 8, wherein the ML engine performs further steps, including:
analyzing another plurality of documents that are associated with one or more other actions that are previously performed; and
modifying the training of the one or more ML models to include training based on the other plurality of documents.

13. The system of claim 8, wherein the ML engine performs further steps, including:
automatically analyzing one or more other pending actions; and
in response to the one or more risk values exceeding a threshold value, automatically providing one or more notifications.

14. The system of claim 8, wherein the ML engine performs further steps, including:
determining a reputation score for each party to the one or more pending actions based on the one or more actions that were performed previously; and
modifying the one or more risk values based on the reputation score for each party.

15. A processor readable non-transitory storage media that includes instructions for managing document over a network, wherein execution of the instructions by one or more processors on one or more network computers performs steps, comprising:
instantiating a machine learning (ML) engine to perform actions, including:
analyzing a plurality of documents that are associated with one or more actions that were performed previously;
determining one or more critical events that are associated with the performance of the one or more actions based on the plurality documents, wherein a portion of the one or more critical events are discovered through application of one or more of rules, heuristics, or ML modeling to the plurality of documents or the one or more actions associated with the plurality of documents;
generating one or more ML models based on the one or more critical events and the plurality of documents, wherein the ML models are trained to predict one or more risk values that are associated with the one or more critical events until an accuracy rate of the predicted one or more risk values meets one or more defined thresholds; and
in response to a request to provide one or more risk values that are associated with one or more pending actions, performing further steps, including:
determining one or more documents that are associated with the one or more pending actions based on the request;
determining the one or more critical events that are implicitly and explicitly associated with the one or more pending actions based on the request and the one or more documents, wherein the one or more implicit and explicit critical events are included in a data object that references the one or more documents to improve the performance of computing resources employed to execute the instructions;
employing the one or more ML models to generate the one or more risk values based on the one or more documents, the predicted one or more risk values and the one or more implicit and explicit critical events; and
providing the one or more risk values in response to the request.

16. The media of claim 15, wherein the ML engine performs further steps, including:
receiving one or more external inputs of different types of information, including one or more of political information, weather information, commodity supply information, or cultural information; and
modifying the one or more ML models based on the external inputs.

17. The media of claim 15, wherein the ML engine performs further steps, including:
providing one or more heuristics that are configured to validate the one or more predicted risk values; and
modifying the one or more predicted risk values based on the one or more heuristics.

18. The media of claim 15, wherein the ML engine performs further steps, including:
monitoring one or more external input sources for updated external information; and
updating the one or more risk values based on the updated external information.

19. The media of claim 15, wherein the ML engine performs further steps, including:

analyzing another plurality of documents that are associated with one or more other actions that are previously performed; and modifying the training of the one or more ML models to include training based on the other plurality of documents.

20. The media of claim 15, wherein the ML engine performs further steps, including:

automatically analyzing one or more other pending actions; and in response to the one or more risk values exceeding a threshold value, automatically providing one or more notifications.

21. The media of claim 15, wherein the ML engine performs further steps, including:

determining a reputation score for each party to the one or more pending actions based on the one or more actions that were performed previously; and modifying the one or more risk values based on the reputation score for each party.

22. A network computer for managing documents, comprising:

a transceiver that communicates over the network;

a memory that stores at least instructions; and one or more processors that execute instructions that perform steps, including:

instantiating a machine learning (ML) engine to perform actions, including:

analyzing a plurality of documents that are associated with one or more actions that were performed previously;

determining one or more critical events that are associated with the performance of the one or more actions based on the plurality documents, wherein a portion of the one or more critical events are discovered through application of one or more of rules, heuristics, or ML modeling to the plurality of documents or the one or more actions associated with the plurality of documents;

generating one or more ML models based on the one or more critical events and the plurality of documents, wherein the ML models are trained to predict one or more risk values that are associated with the one or more critical events until an accuracy rate of the predicted one or more risk values meets one or more defined thresholds; and in response to a request to provide one or more risk values that are associated with one or more pending actions, performing further steps, including:

determining one or more documents that are associated with the one or more pending actions based on the request;

determining the one or more critical events that are implicitly and explicitly associated with the one or more pending actions based on the request and the one or more documents, wherein the one or more implicit and explicit critical events are included in a data object that references the one or more documents to improve the performance of computing resources employed to execute the instructions;

employing the one or more ML models to generate the one or more risk values based on the one or more documents, the predicted one or more risk values and the one or more implicit and explicit critical events; and providing the one or more risk values in response to the request.

23. The network computer of claim 22, wherein the ML engine performs further steps, including:

receiving one or more external inputs of different types of information, including one or more of political information, weather information, commodity supply information, or cultural information; and modifying the one or more ML models based on the external inputs.

24. The network computer of claim 22, wherein the ML engine performs further steps, including:

providing one or more heuristics that are configured to validate the one or more predicted risk values; and modifying the one or more predicted risk values based on the one or more heuristics.

25. The network computer of claim 22, wherein the ML engine performs further steps, including:

monitoring one or more external input sources for updated external information; and updating the one or more risk values based on the updated external information.

26. The network computer of claim 22, wherein the ML engine performs further steps, including:

analyzing another plurality of documents that are associated with one or more other actions that are previously performed; and modifying the training of the one or more ML models to include training based on the other plurality of documents.

27. The network computer of claim 22, wherein the ML engine performs further steps, including:

automatically analyzing one or more other pending actions; and in response to the one or more risk values exceeding a threshold value, automatically providing one or more notifications.

28. The network computer of claim 22, wherein the ML engine performs further steps, including:

determining a reputation score for each party to the one or more pending actions based on the one or more actions that were performed previously; and modifying the one or more risk values based on the reputation score for each party.

* * * * *